Patented Jan. 1, 1924.

1,479,757

UNITED STATES PATENT OFFICE.

WALTER E. TRENT, OF WASHINGTON, DISTRICT OF COLUMBIA, ASSIGNOR, BY MESNE ASSIGNMENTS, TO TRENT PROCESS CORPORATION. OF WILMINGTON, DELAWARE, A CORPORATION OF DELAWARE.

ART OF TREATING COAL.

No Drawing.     Application filed November 12, 1919.   Serial No. 337,571.

*To all whom it may concern:*

Be it known that WALTER E. TRENT, citizen of the United States, residing at Washington, District of Columbia, has invented certain new and useful Improvements in the Art of Treating Coal, of which the following is a specification.

The invention relates to an art of treating fuels.

Considerable difficulty is now experienced in transporting and handling pulverized or powdered coal, primarily for the following reasons: first, because of the dusting characteristics of the coal; second, on account of the danger involved; third, because of its tendency to absorb moisture; and fourth, on account of its bulkiness, all of these reasons materially limiting its use as a fuel, notwithstanding its other advantages.

I have found that pulverized coal can be treated with oil so as to attain a variety of results, which results may be opposite in character, depending upon the quantity of oil used. By the addition of a very small quantity of oil, approximately one-half of one per cent, to coal, and a proper agitation of same, the coal is still maintained in a dry powdered or fluffy condition but its tendency of dusting is eliminated, as the oil serves to combine or prevent the exceedingly fine particles of coal from blowing from the mass. By the addition of substantially this same amount of oil, the coal loses its tendency to absorb moisture, and likewise its danger of spontaneous combustion is eliminated.

When a quantity of pulverized coal has been mixed with this percentage of oil, a stable suspension may be produced by adding thereto water of a desired quantity. The coal particles treated with the oil will neither sink nor float in the volume of water, but are maintained in uniform suspension throughout the body thereof for definite periods thereby providing a very permanent substance in which the different ingredients do not segregate. In adding the oil to the coal, if approximately two and one-half to five per cent oil is applied, the coal no longer will retain its dry, fluffy condition, and cannot be easily fed by an air blast to a combustion chamber, and a condition of this nature should be guarded against. When this quantity of oil has been added to the coal, the same will not mix with water, but is put into a frothy or foamy state and tends to float on the water, a condition undesirable if the mixture is to be used as a fuel that has to stand storage and transportation, but it will be understood that if there are particles of coal suspended in a body of water and in the nature of a dilute solution, these coal particles can be easily collected by the injection of this percentage of oil thereto and a slight agitation, resulting in the formation of a foamy, frothy condition of the coal suspended upon the surface of the water.

By adding a still greater percentage of oil to the dry, powdered coal, say from fifteen to thirty per cent, the mass will become decidedly greasy, and when introduced to water, maintain a solid and crumbly condition, and will not mix with water. It is desirable to treat the coal in this manner when a fuel is needed which will stand storage and transportation, and one wherein the fuel is introduced to a combustion chamber manually by means of a shovel or the like, as it will be understood that this fuel is in a somewhat solid form and cannot be fed by an air current. If the quantity of oil added to the coal approximates thirty to sixty per cent, the two substances combine into a greasy, pasty mass occupying little more than half the space or volume of the coal in its original dry powdered condition, thus putting the finely pulverized coal in a desirable condition for transportation, but of a semi-liquid state so that the same may be fed to a combustion chamber for burning under pressure through the medium of mechanical, hydraulic, or other pressure feeding devices.

In treating the coal, great care should be exercised in not introducing thereto a greater volume of oil than that last specified, as an excess supply of oil will result and merely flow from the mixture, causing a material waste. If the coal mixed with about one part of coal dust to one part of oil is introduced to a body of water, a greasy mass will sink to the bottom of the container and the excessive free oil merely collects on top of the water and is usually wasted.

It will thus be seen that a great range of varying results are obtained by mixing coal with proper quantities of oil in varying proportions depending upon the nature of the fuel that is to be produced, or the work that the oil is to accomplish. With a very small percentage of oil, a substantially dry powdered coal is produced that overcomes the material objections heretofore encountered in the use of pulverized coal, while the application of a like quantity of oil to the coal, enables the same to be introduced to a body of water and form a permanent solution. As pointed out, each of the results heretofore outlined are desirable at times, and in following out the invention, it is only necessary to apply oil in the proportions specified to accomplish these results.

In the treatment of coal products, I preferably treat only the carbonaceous content of the coal, as it is obviously desirable to first remove the non-carbonaceous content of the coal before using the carbonaceous matter, but ordinary coal dust as is now commonly burned, can be treated with the same advantageous results as are obtained in the treatment of the carbonaceous material.

In carrying out the processes, the following formulas may be followed, but I wish it to be distinctly understood that my invention is not limited to the exact proportions as specified in these formulas for producing the fuels of different characteristics, as it is apparent that the nature of the coal and the oil must be given consideration and the relative proportions of the two may be considerably varied without departing from this invention.

When the finely divided carbonaceous material is to be treated to prevent or curtail its objectionable dusting, yet to maintain the particles in a comparatively dry and separated state of division, there is introduced to a mass of the coal a quantity of oil approximately equal to one-half of one per cent of the coal. This mass is then agitated so as to thoroughly distribute the oil, the oil acting to prevent the exceedingly fine particles of the coal from blowing from the mass, but it does not cause a material agglomeration of the entire mass. Some of the finer particles may combine, but the application of the oil does not affect a combination of the normal or usual coal particles. This oil likewise puts the coal in such a condition as to overcome the danger of spontaneous combustion, although it is in a comparatively dry state and suitable for feeding by an air blast.

It is highly desirable at times and for many uses to provide a solution containing the carbonaceous matter which is of a stable and permanent nature for feeding as a liquid, and in following this process the carbonaceous material may be treated with approximately one-half of one per cent of oil and then introduced to a body of water. The mass is then agitated and the carbonaceous material and oil is uniformly distributed throughout the body of water and stays in suspension therein for indefinite periods, during which time the different ingredients have no tendency whatever to segregate. The present invention is also primarily intended to provide a means of collecting from a dilute solution the coal particles suspended therein, and this may be accomplished by introducing to a solution of this character, a quantity of oil approximately equal to two and one-half to five per cent of the coal, which serves to collect the coal when the mass is agitated, putting the same in a foamy and frothy condition, floating upon the surface of the body of water. The coal thus collected may, of course, be burned in any suitable manner.

For many purposes it is desirable to produce a fuel which is handled manually, yet one containing a base of carbonaceous material to which is applied a small quantity of oil. By adding to a body of pulverized coal a quantity of oil, approximately equal to five to fifteen per cent of the coal, a somewhat solid fuel is provided that possesses such qualities as to maintain itself in a desirable condition for burning, and this fuel may be introduced to a combustion chamber by stokers or hand shovels from time to time.

The invention further contemplates the production of a semi-liquid or pasty fuel, consisting of the carbonaceous material and oil in such relative quantities as to produce a very greasy mass in which the oil will not settle nor segregate, but will remain uniformly distributed throughout the entire mass until the same is consumed. To produce a fuel of this nature, to a body of finely pulverized carbonaceous material is introduced a quantity of oil equal to from thirty to sixty per cent of the carbonaceous material, and the mass thoroughly agitated. The resultant greasy fuel is of a highly stable nature and inasmuch as the same is in a semi-liquid state, it can be readily fed to a combustion chamber by a mechanical, hydraulic, or other pressure feeding means.

Having thus described the invention, what I claim is:

1. The process of producing a fuel which consists in introducing to a mass of finely pulverized coal an oil in such a limited quantity sufficient to prevent dusting of the fine coal particles, without causing a dense agglomeration of the coal particles.

2. A fuel consisting of finely divided coal and oil thoroughly intermixed therewith in a limited quantity as to prevent a dense agglomeration of the pulverized particles, but serving to prevent dusting of said fine particles.

3. The process of producing a fuel substance, which consists in introducing to a mass of pulverized coal in the form of an impalpable powder, a hydrocarbon oil, said oil being in a quantity as to combine with the exceedingly fine particles of the coal to prevent dusting thereof without causing a material agglomeration of the fine coal particles.

4. The process of producing a composite fuel which consists in mixing with finely pulverized coal a hydrocarbon oil, the quantity of the oil not exceeding one per cent of the mass to combine with the fine particles to prevent dusting thereof without causing a coal particles to materially agglomerate.

5. An artificial fuel substance of a plastic consistency composed of finely pulverized coal mixed with a hydrocarbon oil, the oil being in the proportion from substantially 15 to 30 per cent of the fuel mass by weight.

In testimony whereof I affix my signature.

WALTER E. TRENT.